Jan. 13, 1925.

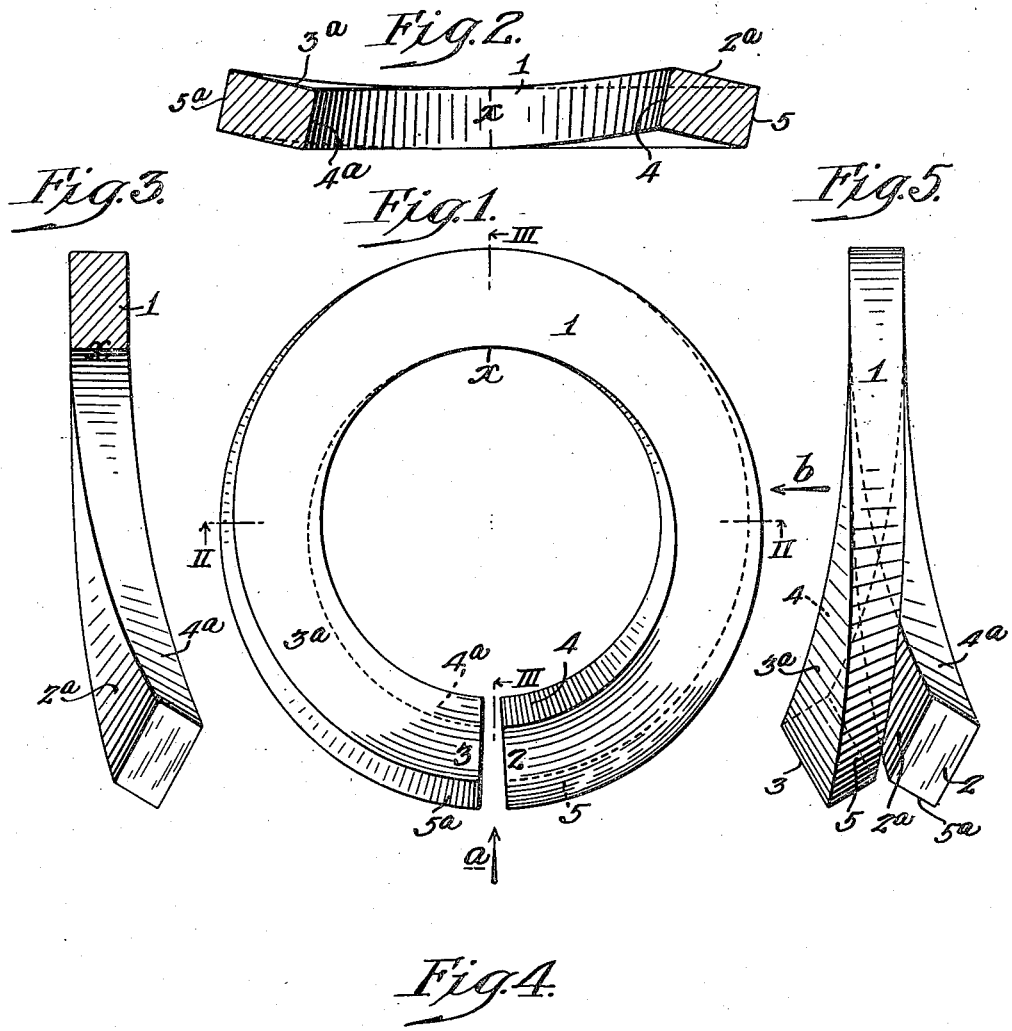
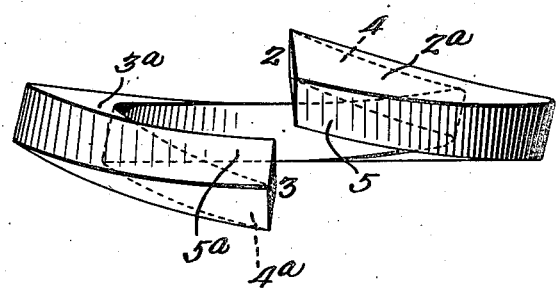

G. W. WHITEMAN

NUT LOCK

Filed Feb. 24, 1922    2 Sheets-Sheet 2

1,523,045

Inventor
George W. Whiteman
by Murray C. Boyer
Attorney

Witness:
Walter Chism

Patented Jan. 13, 1925.

1,523,045

UNITED STATES PATENT OFFICE.

GEORGE W. WHITEMAN, OF PHILADELPHIA, PENNSYLVANIA.

NUT LOCK.

Application filed February 24, 1922. Serial No. 538,857.

*To all whom it may concern:*

Be it known that I, GEORGE W. WHITEMAN, a citizen of the United States, and a resident of Philadelphia, Pennsylvania, have invented certain new and useful Improvements in Nut Locks, of which the following is a specification.

While my invention relates generally to nut locks or nut lock washers, and more particularly to nut locks such as are formed from a helical section or segment, it is not limited thereto and the main object of my invention is to stiffen a nut lock so formed, or otherwise produced, so as to increase the resistance which such forms of nut locks are designed to afford against or between the clamping elements.

A further object of my invention is to provide a nut lock made of a metal strip or ribbon having a cross section of greater dimensions in one plane than in another, with a continuous twist from end to end so that while any radial line on the surface of the nut lock may lie in a substantially uniform plane or curve, such surface considered as a whole is constantly changing in curvature and angle from one terminal to the other; and the angle at which one terminal is disposed may differ from the angle of the other terminal, substantially opposite the same, but following the twist or curvature of the nut lock body and therefore out of registry or alignment therewith.

A further object of my invention is to provide a structure with an irregular contour constituting, substantially, a continuously twisted condition so that while one portion may occupy a curved position in one direction, the other portion will occupy a curved position in another direction.

A further object of my invention is to provide a spring-washer nut-lock of the split-ring type comprising in general form a segment of a helix; the body of said washer having a continuous twist from end to end of the same, and each end of said helix being tilted at an angle out of line with respect to a plane disposed at right angles to the axis of the helix.

In all instances the combination of such curved portions produces a relatively twisted condition so that the action of a compressing member applied to the nut lock with a view of rendering available the tension provided by the displaced portions of said nut lock, will cause the latter to offer resistance in a plurality of directions; the changes of contour and shape effected by the compressive strains tending to displace the twisted or curved condition in addition to compressing the ends or terminals of the nut lock which are normally displaced or lie in different planes and out of alignment or registry with each other.

These and other features of my invention are more fully described hereinafter, reference being had to the accompanying drawings, in which:

Figure 1, is a plan view of one form of nut lock within the scope of my invention.

Fig. 2, is a sectional view on the line II—II, Fig. 1.

Fig. 3, is a sectional view on the line III—III, Fig. 1.

Figs. 4 and 5, are elevations looking in the direction of the arrows *a* and *b*, respectively, Fig. 1.

Figure 6:
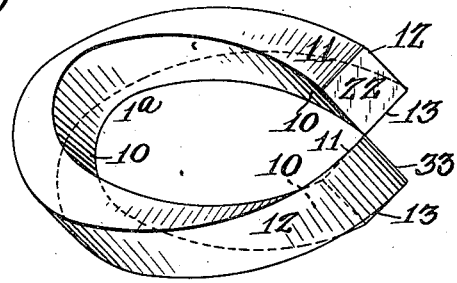
Fig. 6, is a perspective view of another form of nut lock within the scope of my invention.

The form of nut lock to which my invention has been applied, may be of the type which may be made by winding a metal strip or ribbon of suitable cross section around a suitable mandril, and then cutting through the turns of such metal strip or ribbon; thereby providing a series of helical members or elements, each of the same contour or character.

In winding the metal strip around the mandril, the same may be given a slightly diagonal or angular position with respect to the mandril so as to produce, when cut from the mandril, a helical element slightly cup-shaped in cross section. In the formation of such washer, such initial operation may and usually does produce the desired twist or body curvature for one half of the nut lock, or from one of the terminals to a point substantially opposite the cut separating the termini of such body, and then by placing such nut lock between suitable dies, the opposite side of the nut lock may be given a twist in the opposite direction; the combined result of such operations producing a nut lock or nut lock washer having a continuous twist or curvature from end to end of its body.

Upon referring to Figs. 1, 2, 3, 4 and 5, the body of the nut lock is indicated at 1, and the terminals of such body are indicated at 2 and 3. That portion of the body which terminates in the end 2, may be twisted or curved toward the right so that the surface 2ª, for instance, from an imaginary line x, substantially opposite the cut separating the terminals turns outward; lifting the inner edge of the body gradually toward the terminal, as indicated at 4, while the outer edge is turned down, as indicated at 5. In like manner, the portion of the body which terminates in the end 3, may be twisted or curved toward the right so that the surface 3ª, for instance, from the imaginary line x, substantially opposite the cut separating the terminals turns inward; lifting the outer edge of the body gradually toward the terminal, as indicated at 5ª, while the inner edge is turned down, as indicated at 4ª. In addition, the ends of the body, 2 and 3, are displaced with respect to each other as in ordinary nut locks; occupying substantially the position the band or strip of metal from which they are made assumes when wound upon the mandril; which position is retained for use.

Upon referring to Figs. 1, 2, 3, 4 and 5, it will be noted that while the twist or curvature of the nut lock washer is continuous from end to end, the angle of the surface on one side, from one terminal to the point x, lies in one position or extends in one direction while on the other side, such angle lies in the opposite position or extends in the opposite direction, and whereas one terminal lies above the plane or position of the other, both are in such angular relation with respect to a compressing element, a nut. for instance, that the pressure applied by such compressing element is not only exerted to close the washer by displacing the position of the ends or terminals 2 and 3, but also to remove the twist that has been placed in the body so that the character of the resistance is of a two-fold nature.

It will be understood, of course, that the curvature or twist of the body of the nut lock may extend to the left, instead of to the right, as indicated in Figs. 1, 2, et seq., without departing from my invention.

It will be understood, of course, that metal of any form of cross section, other than circular, susceptible of having a twist placed therein, may be employed in the manufacture of my improved nut locks, and that any type of nut lock is within the scope of my invention, wherein a body twist is continuous from end to end of the same.

In lieu of preparing my improved nut lock from a strip or band of metal of suitable cross section wound around a mandril and subsequently cut, my improved nut locks may be made by stamping or cutting the same from sheet, bar, or strip metal of suitable thickness, in the form of disk rings, splitting such rings by a radial cut, and then displacing the body of the same to impart the desired continuous twist, with the ends formed by the radial cut out of alignment or registry.

In Fig. 6, I have shown a nut lock 1ª, which may be made of metal substantially square in cross section, having surfaces indicated at 10, 11, 12, and 13, and in which one surface of the body, 10 for instance, occupying one position at one end or terminal 22, is displaced by twisting the body of the nut lock and at the other end or terminal 33, occupies a position which may be at right angles to the first position.

Figure 7:
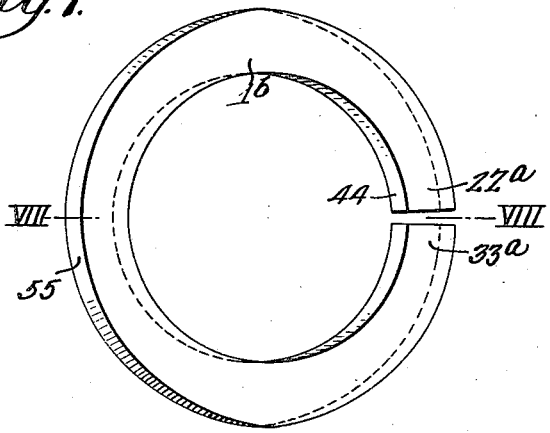
Fig. 7, is a plan view of still another form of nut lock within the scope of my invention.
Figure 8:
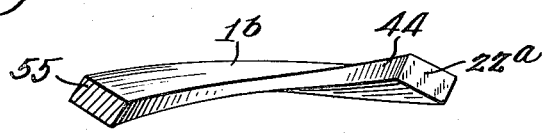
Fig. 8, is a sectional view on the line VIII—VIII, Fig. 7.

In Figs. 7 and 8, I have shown a form of nut lock, 1ᵇ, in which the body is displaced so as to impart a sinuous or twisted contour so that no two surfaces of the body occupy the same plane or any plane or any plane parallel to another. The twist may be in the same direction, throwing both inner edges of the terminal ends 22ª and 33ª upward, as indicated at 44, with the opposite outer edge also thrown upward as indicated at 55, and as the ends 22ª and 33ª are out of alignment or registry, the desired twisted effect is imparted to the nut lock.

In all instances, my improved nut lock provides resistance of dual character; that tending to resist closure of the displaced ends of the body, and that tending to resist removal of the twist imparted to the body.

I claim:

1. A spring-washer nut-lock of the split-ring type comprising in general form a segment of a helix; the body of said washer having a continuous twist from end to end of the same, and each end of said helix being tilted at an angle out of line with respect to a plane disposed at right angles to the axis of the helix.

2. A spring-washer nut-lock of the split-ring type comprising in general form a segment of a helix; with a body rectangular in cross-section and having a continuous twist from end to end of the same and having its ends angularly disposed with respect to each other and projecting in opposite directions with respect to a plane disposed at right angles to the axis of the helix; the twist imparted to one end of said helix differing from that imparted to the other.

3. A spring-washer nut-lock of the split-ring type comprising in general form a segment of a helix with a body having a continuous twist from end to end of the same, the curvature of the twist causing the outer edge of one end and the inner edge of the other end to lie in planes diagonally disposed with respect to each other.

4. A spring-washer nut-lock of the split-ring type comprising a discontinuous body substantially rectangular in cross-section and substantially circular in contour, and being twisted continuously from one terminal to the other whereby said terminals are diagonally disposed with respect to each other and out of line with respect to a plane disposed at right angles to the axis of the helix.

In witness whereof I have signed this specification.

GEORGE W. WHITEMAN.